(12) United States Patent
Lindblom

(10) Patent No.: US 6,783,307 B2
(45) Date of Patent: Aug. 31, 2004

(54) ROTATABLE TOOL WITH REMOVABLE CUTTING PART

(75) Inventor: Stefan Lindblom, Gävle (SE)

(73) Assignee: Sandvik AB, Sandviken (SE)

( * ) Notice: Subject to any disclaimer, the term of this patent is extended or adjusted under 35 U.S.C. 154(b) by 43 days.

(21) Appl. No.: 10/279,870

(22) Filed: Oct. 25, 2002

(65) Prior Publication Data

US 2003/0091402 A1 May 15, 2003

(30) Foreign Application Priority Data

Oct. 25, 2001 (SE) .............................................. 0103555

(51) Int. Cl.$^7$ .............................................. B23B 51/02
(52) U.S. Cl. ....................... 408/226; 408/230; 408/231; 408/713
(58) Field of Search ............................... 408/144, 230, 408/226, 227, 231, 232, 233, 713

(56) References Cited

U.S. PATENT DOCUMENTS

| | | | |
|---|---|---|---|
| 4,547,103 A | 10/1985 | Pape et al. | |
| 5,607,263 A | 3/1997 | Nespeta et al. | |
| 5,904,455 A | 5/1999 | Krenzer et al. | |
| 5,947,660 A | 9/1999 | Karlsson et al. | |
| 6,053,670 A | 4/2000 | Schmid | |
| 6,183,688 B1 | 2/2001 | Karlsson et al. | |
| 6,485,235 B1 | * 11/2002 | Mast et al. | 408/1 R |
| 6,530,728 B2 | * 3/2003 | Eriksson | 408/233 |
| 2002/0057951 A1 | 5/2002 | Silver | |

FOREIGN PATENT DOCUMENTS

| | | |
|---|---|---|
| DE | 32 30 688 | 2/1984 |
| DE | 34 48 086 | 12/1991 |
| DE | 297 23 558 | 12/1998 |
| DE | 202 04 848 U1 | 7/2002 |
| WO | WO 01/30524 | 5/2001 |

* cited by examiner

Primary Examiner—Daniel W. Howell
(74) Attorney, Agent, or Firm—Burns, Doane, Swecker & Mathis, L.L.P.

(57) ABSTRACT

A rotatable tool for chip removing machining having a rotatable holder part and a cutting part that is detachably connected to a front end of the holder part. In a front end portion of the holder part, a forwardly open slot is formed, which separates two elastically flexible branches of the holder part. For clamping of the cutting part on the holder part, a male/female coupling is arranged, which comprises a centrical, male-like pin on one of the parts and a corresponding seat in the other part. Disposed on the holder part radially outside of the male/female coupling are thrust load carrying support surfaces, which surfaces are at least partially conical and are engaged by corresponding support surfaces of the cutting part. During a cutting operation, axial thrust loads transmitted to the axial thrust support surfaces cause the branches to be pressed in a direction intensifying the radial contact between the pin and the seat.

10 Claims, 3 Drawing Sheets

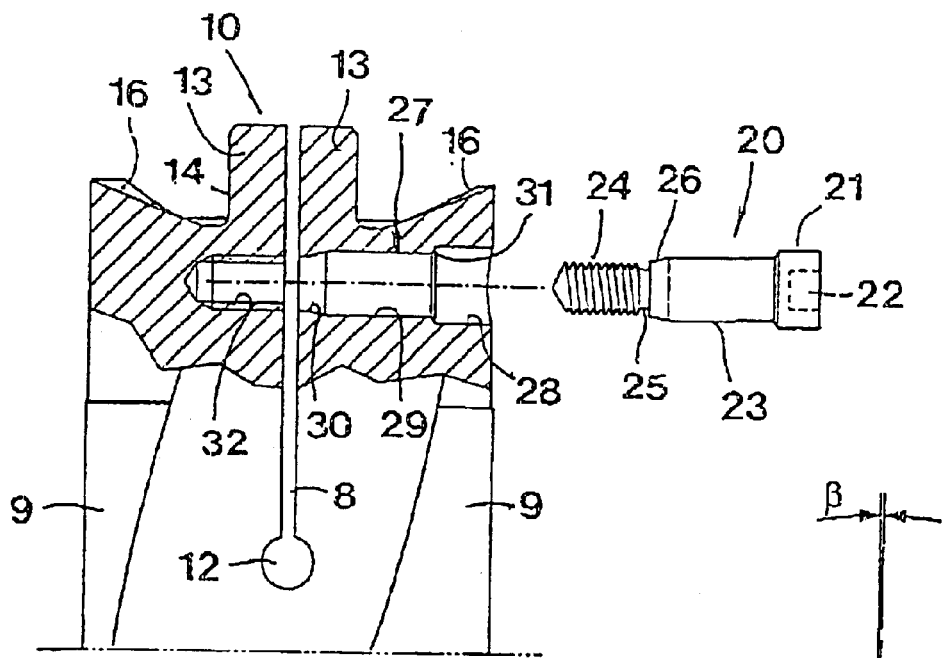
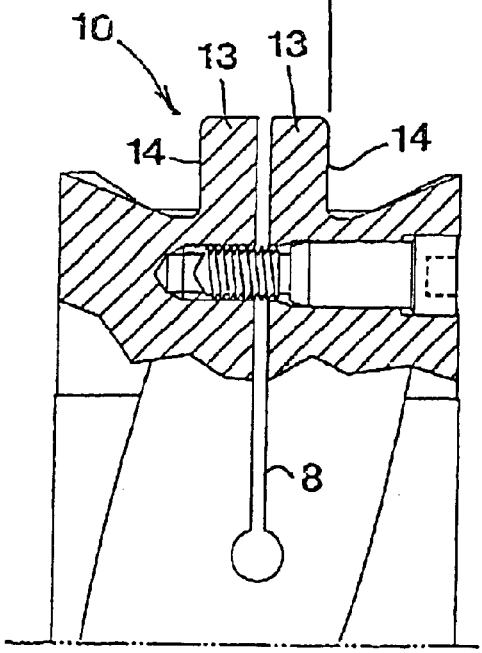
Fig 5
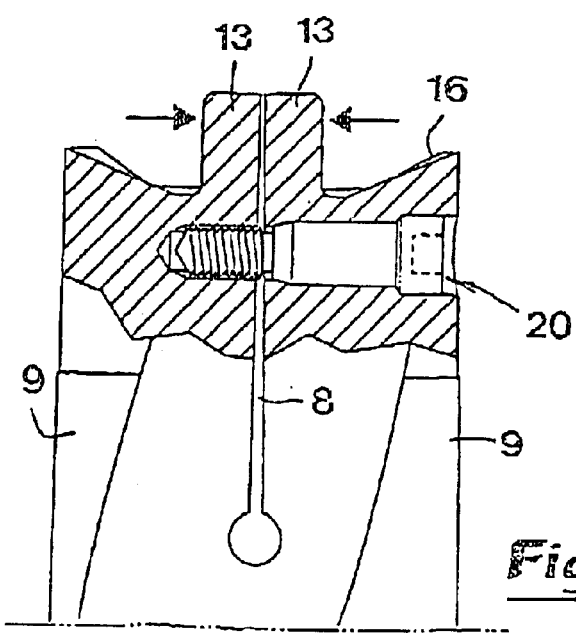
Fig 7
Fig 6

ROTATABLE TOOL WITH REMOVABLE CUTTING PART

This application claims priority under 35 U.S.C. §119 and/or 365 to Patent Application Serial No. 0103555-9 filed in Sweden on Oct. 25, 2001, the entire content of which is hereby incorporated by reference.

TECHNICAL FIELD OF THE INVENTION

This invention relates to a rotatable tool intended for chip removing or chip forming machining, comprising two portions, viz. a rotatable holder part mountable in a machine, and a cutting part that is detachably connected to a front end of the holder part, a forwardly open slot being formed in a front end portion of the holder part, which slot separates two or more elastically flexible or resilient branches.

PRIOR ART

Chip forming tools of the type that uses a holder part or basic body as well as a separate, replaceable cutting part may in practice be of highly varying shapes and may consist of, for instance, drilling tools, milling tools, such as shank-type cutters and slot cutters, respectively, thread cutters, etc. The holder part usually consists of a long narrow, cylindrical shank. In modern machine tools, the holder parts are so sophisticated and expensive that they, for economical reasons, cannot be integrated with the cutting part, which constitutes the wearing part of the tool. In other words, it is profitable to make the proper cutting part as a separate, detachable unit (usually denominated "loose top" by those skilled in the art), which may be replaced after wear-out, while the expensive holder part may be used for a longer period of time.

Previously known cutting tools of the type in question may be divided into two main categories, a first of which being based upon the idea of attaching the cutting part at the front end of the holder part by means of a short screw, which extends through a through hole in the cutting part and is tightened in a female thread that extends axially in the holder part and is open at the front end thereof. Examples of such tools are disclosed in U.S. Pat. No. 5,607,263, DE-34 48 086-C2 and DE-297 23 558-U1. A disadvantage of said kind of tool is, however, that cutting edges cannot be formed in the central area of the front end of the cutting part. The consequence of this is that the cutting part can only be made for certain types of milling (e.g., milling of T-slots), but not for drilling and other milling operations.

Another category of tools use a drawbar that is disposed within an axial bore within the holder part and includes means at the front end there of for clamping the cutting part. Tools having drawbars for the cutting parts are previously known from, for instance, EP 0 911 10 (corresponding U.S. Pat. No. 6,053,670), WO 96/34714 (corresponding U.S. Pat. Nos. 5,947,660 and 6,183,688) and WO 01/30524. A disadvantage of said type of tools is, however, that tightening of the drawbar takes place in the area of the rear end of the drawbar and the holder part. This means that the holder part has to be removed from the machine in question to exchange the cutting part.

In U.S. Pat. No. 5,904,455, a drilling tool is disclosed, the holder part or shank of which in the front end thereof possess a recess defined by two branches for receipt of a cutting part. Furthermore, in the front end portion of the holder part, a narrow slot is formed with the purpose of enabling elastic deflection of the branches. The two branches are formed having inwardly turned flank surfaces, which may be resiliently pressed against contact surfaces on the sides of the cutting part, more precisely thanks to wedge surfaces being pressed into a V slot in the rear end of the cutting part. The wedging is guaranteed by means of an axial screw within the holder part. A disadvantage of said tool is, however, that the cutting part as well as the holder part has to be manufactured with a very high dimensional accuracy. Another disadvantage is that the tool demands dismounting from the appurtenant machine in order to enable manipulation of the screw in connection with exchange of the cutting part.

OBJECTS AND FEATURES OF THE INVENTION

The present invention aims at obviating the above-mentioned disadvantages of previously known cutting tools of the type in question and at providing an improved cutting tool. Thus, a primary object of the invention is to provide a cutting tool that not only allows simple mounting and dismounting of the cutting unit without requiring that the holder part be removed from a machine, but also enables cutting edges or cutting inserts to be disposed at the center of the front surface of the cutting part. An additional object is to provide a tool, the two main parts of which, i.e., the cutting part and the holder part, respectively, can be series produced separately in a simple and cost-effective way while guaranteeing a good centering of the cutting part in relation to the holder part. Among other things, each one of the two parts should be able to be produced by means of simple machining operations and with a minimum of advanced grinding operations. Yet an object of the invention is to provide a tool that minimizes the wear of the holder part, thereby securing a long service life of the same.

According to the invention, at least the primary object is attained by a rotatable tool for chip removing machining which comprises a holder part and a cutting part. The holder part defines a center axis of rotation and includes an axially front end in which a slot is formed between elastically flexible branches of the holder part. The branches are elastically deformable or deflectable from a rest state thereof. The cutting part is detachably connected to the branches. The holder part and the cutting part form a male/female coupling comprising a male part disposed on either the holder part or the cutting part, and a female part formed in the other of the holder part and the cutting part. The male part is received in the female part. First support surfaces are formed on the front end of the holder part, and second support surfaces are formed on the cutting part and engage the first support surfaces. The first and second support surfaces are situated radially outside of the male/female coupling and are at lest partially conically shaped for elastically urging the male and female parts radially together in response to the transmittal of axial thrust loads from the second support surfaces to the first support surfaces.

BRIEF DESCRIPTION OF THE DRAWINGS

The objects and advantages of the invention will become apparent from the following detailed description of a preferred embodiment thereof in connection with the accompanying drawing in which like numerals designate like elements, and in which

FIG. 5 is a partially sectioned side view showing two male pin elements included in the holder part in a tension-less starting position, a tightening screw being shown spaced-apart from the holder part.

FIG. 6 is an analogous side view showing the tightening screw mounted in the holder part, the same being tightened in order to draw the male pin elements together.

FIG. 7 is an additional side view showing the tightening screw mounted in the holder part, although in an inactive state.

DESCRIPTION OF PREFERRED EMBODIMENTS OF THE INVENTION

Figure 1:
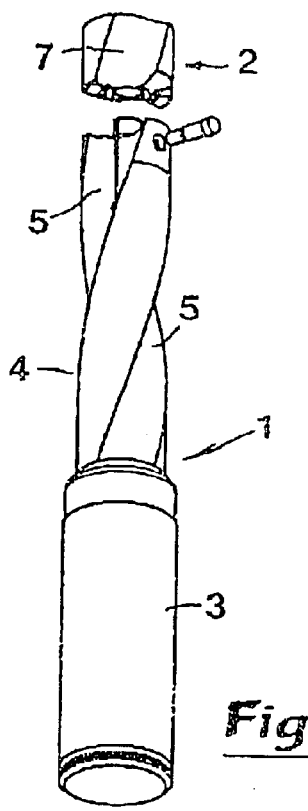
FIG. 1 is an exploded perspective view of a tool in the form of a drill that includes a holder part in the form of a shank, as well as a replaceable cutting part or loose top, the parts being viewed obliquely from behind or from below.
Figure 2:
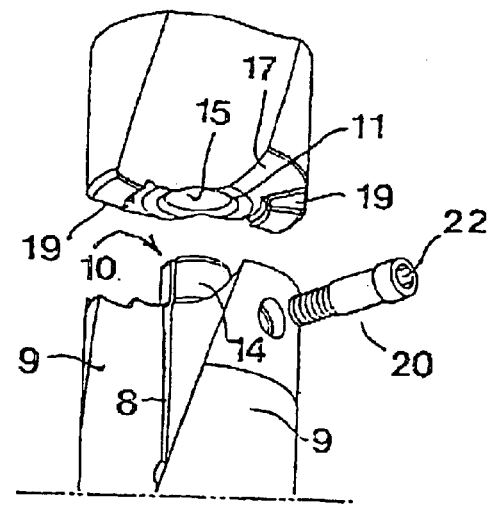
FIG. 2 is a partial enlargement of the same exploded view as in FIG. 1.
Figure 3:
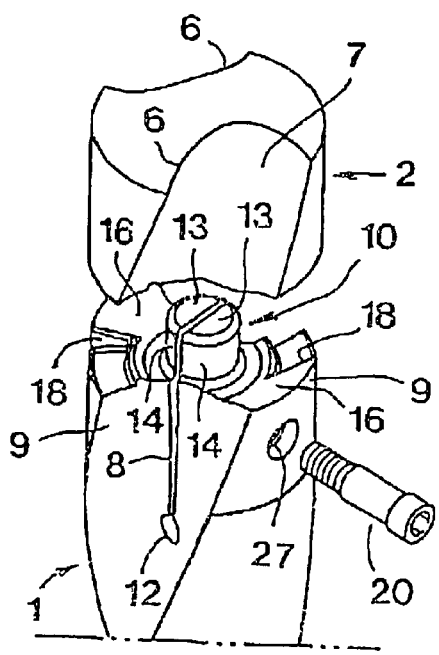
FIG. 3 is an exploded view showing the parts of the tool viewed obliquely from the front or from above.

In FIGS. 1–7, a first embodiment of a rotatable, chip removing tool according to the invention is visualized, more precisely in the form of a drill, which in the usual manner includes a holder part, in its entirety designated 1, as well as a replaceable cutting part or loose top 2. The holder part is formed with a rear, substantially cylindrical part 3, which is mountable in a machine, e.g. a multi-operational machine, as well as a thinner shank 4 having two helicoidal, cross-section-wise curved chip channels 5. The front end of the loose top 2 is formed with cutting inserts or cutting edges, which are partly outlined at 6 in FIG. 3. Generally, the loose top 2 is of a circular external contour shape having a diameter that is somewhat larger than the diameter of the shank 4. However, in the loose top, concavely curved limiting surfaces 7 are formed that connect with the curved shape of the chip channels 5.

The loose top 2 is entirely or partly manufactured from a hard, wear-resistant material, such as cemented carbide or the like, while the holder part 1 consists of a material of a greater elasticity, e.g., steel.

In the front free end portion of the shank 4, a forwardly open slot 8 is formed, in a way known per se, which separates front end into two elastically flexible branches 9. Because of the inherent elasticity of the material, said branches can be tensioned inwards toward one another from a starting (rest) position in which they are tensionless.

In the embodiment illustrated in FIGS. 1–7, a pin or pin-resembling body, in its entirety designated 10, is formed integrally on the free front end of the holder part 1. Said pin is intended to interact with a seat 11 in the rear end of the loose top 2. The pin 10 and the seat 11 together form a male/female coupling that, in a characteristic manner of the invention, on one hand centers and clamps the loose top, and on the other hand allows simple mounting and dismounting of the same.

The slot 8 extends from a rear, through hole 12 all the way up to the front end surface of the male pin 10, the slot dividing the male pin into two separate pin sections 13 that are mirror images of one another. Depending on the dimensions of the drill, the slot 8 in the tension-less starting position of the pin elements 13 (see FIG. 5) may have a width within the range of 0.1–1.0 mm, suitably 0.3–0.8 mm. Together the pin sections 13 form a pin having a circular cross-section. The pin is of a rotationally symmetrical, tapering or conical, basic shape. This means that the envelope surfaces 14 of the pin sections are partially cylindrical or conical. In practice, a slightly conical shape of the pin is preferred, more precisely a cone-shape that diverges in the forward direction from the front end of the shank 4. (That is, the diameter of the pin would become larger in the forward direction.) In an analogous way, the rotationally symmetrical delimiting surface 15 of the seat 11 may be slightly conical, more precisely in such a way that the conicity converges in the direction backwards towards the opening of the seat. In this connection, the smallest diameter of the seat 11 (near the mouth of the seat) is somewhat smaller than the maximum diameter of the male pin 10 (near the free end of the pin).

Radially outside of the pin 10, the holder part 1 has axial thrust load carrying surfaces 16, which surfaces are at least partially conical according to the invention. Said support surfaces 16 interact with support surfaces 17 on the loose top 2, said support surfaces 17 also being partially conical. More precisely, the conicity of the support surfaces 16 diverges in a forward direction, i.e., towards the loose top, while the conicity of the support surfaces 17 converges in a backwards direction, i.e, toward the holder part.

In connection with the two thrust load carrying support surfaces 16 of the holder part, recesses are formed that are partially delimited by substantially radially extending carrier surfaces 18. In connection with the support surfaces 17 on the loose top, shoulders are formed having radial abutment surfaces 19 against which the carrier surfaces 18 are pressed in order to transmit the torque of the shank to the loose top during drilling. The (double) cone angle of the surfaces 16, 17 amounts in the example to about 135° and may advantageously be within the range of 120–175°.

In accordance with a preferred embodiment of the invention, the tool preferably includes a clamping device for bringing the pin sections 13 closer to each other during mounting and dismounting, respectively, of the loose top. In FIGS. 5–7, such a clamping device is shown in the form of a screw 20. In addition to a head 21, having a key grip 22, said screw includes a shank having on one hand a cylindrical, non-threaded part 23, and on the other hand a portion having a male thread 24. Said male thread 24 has a diameter that is smaller than the diameter of the cylinder 23. Between the male thread and the cylinder portion, there is a narrow neck 25 and a conical transition surface 26.

In the branch 9 that is shown to the right of the slot 8 in FIGS. 5–7, a through-bore 27 is provided that is divided into three different sections 28, 29, 30. A first section 28 has a larger diameter than the section 29, a ring-shaped abutment surface 31 being formed between said sections. The diameter of the section 28 corresponds to the diameter of the head 21, while the diameter of the section 29 corresponds to the diameter of the cylinder portion 23. In an analogous way, the shape of the section 30 corresponds to the conical shape of the surface 26. In the branch 9, positioned to the left of the slot 8, a hole having a female thread 32 is formed in extension of the bore 27, in which the male thread 24 can be tightened.

By tightening the tightening screw 20, the pin sections 13 can be forced to approach each other as is outlined by means of the arrows in FIG. 6, something that takes place against the action of the inherent resilient force in the elastically resilient branches 9. When the screw then is unscrewed a distance from the female thread to the inactive position that is shown in FIG. 7, the pin sections 13 spring out away from each other.

In FIG. 7, it is outlined by means of the angle β how the envelope surfaces 14 of the pin sections 13 are slightly conical. In practice, said (single) cone angle β may amount to about 0.5°, which means that the pin 10, formed by the pin sections 13, has a somewhat larger diameter at the free end thereof than at the root end. In an analogous way, the internal cone surface 15 in the seat 11 has a somewhat larger diameter near the bottom of the seat than at the backwardly directed mouth of the seat.

Function of the Tool According to the Invention

When a loose top 2 is to be mounted on the holder part 1, the two pin sections 13 assume a starting (rest) position (see FIG. 5) in which they are tension-less, the slot 8 having a maximum width along the entire axial extension thereof. When the screw 20 in the mounted state is tightened in the way that is shown in FIG. 6, the two pin sections 13 will approach each other thanks to the elastic resilient branches 9 being somewhat inwardly deflected towards each other. In this state, the largest diameter of the pin (located in the area of the free end of the pin) is somewhat less than the smallest diameter of the seat 11 (located adjacent to the mouth of the seat), whereby the loose top can be inserted onto the front end of the holder part without obstacle by the pin. As soon as the loose top has been put in place, the screw 20 can be unscrewed a distance out of the female thread to an inactive state, which is shown in FIG. 7. In connection with said unscrewing, the pin sections spring out radially and are pressed against the internal contact surface 15 in the central seat 11 of the loose top. In this way, the loose top is centered and simultaneously resiliently clamped on the holder part. When the drill is set in operation, the conical support surfaces 16 of the holder part will be submitted to thrust forces directed backwards, more precisely via the analogous, conical support surfaces 17 on the loose top. Thanks to the conical shape of the support surfaces, said thrust forces are divided into, on one hand, main force components that are axially directed (backwards), and on the other hand secondary force components that are radially directed. Said secondary force components urge the branches 9 radially outwards from the dividing slot 8, which means that the pin sections 13 are pressed up against the internal contact surface 15 of the seat 11 by a force in addition to the above-mentioned inherent resilient force of the branches 9.

Figure 4:
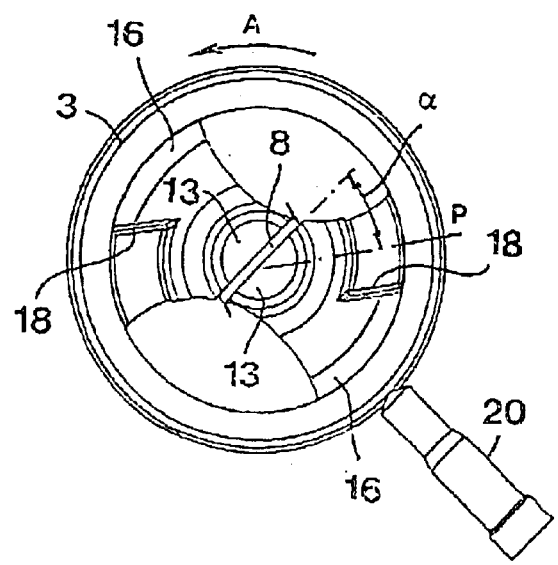
FIG. 4 is an enlarged end view of solely the holder part of the tool.
Figure 8:
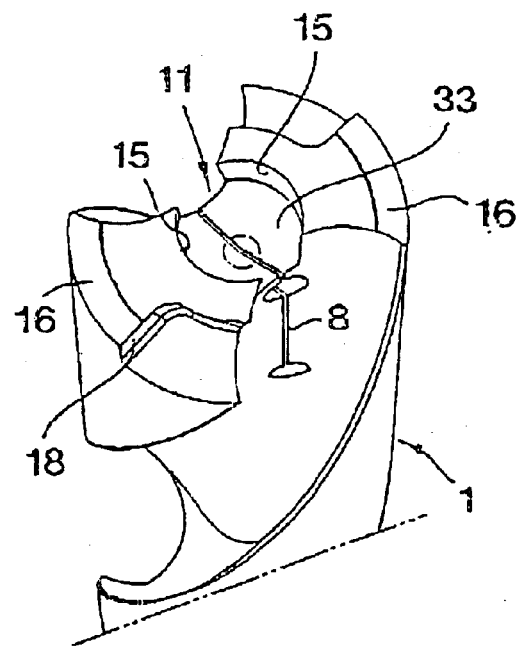
FIG. 8 is a partial perspective view showing an alternative embodiment of a tool, a seat included in the male/female coupling of the tool being formed in the holder part.
Figure 9:
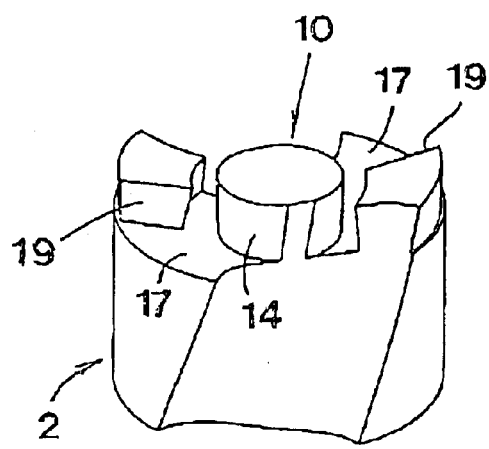
FIG. 9 is a loose top, interacting with the holder part according to FIG. 8, which is shown in an upside-down state having a male pin directed upwards in the drawing.
Figure 10:
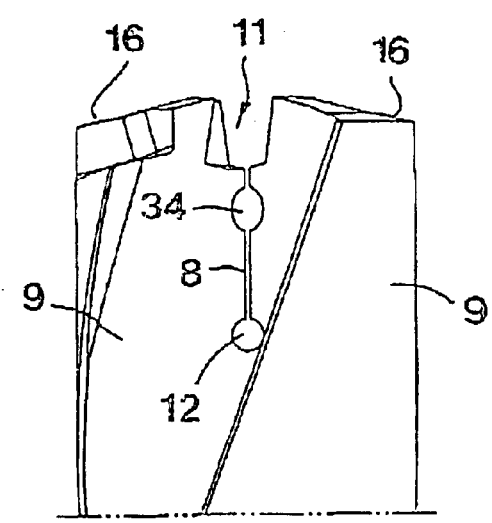
FIG. 10 is a partial side view of the holder part according to FIG. 8.
Figure 11:
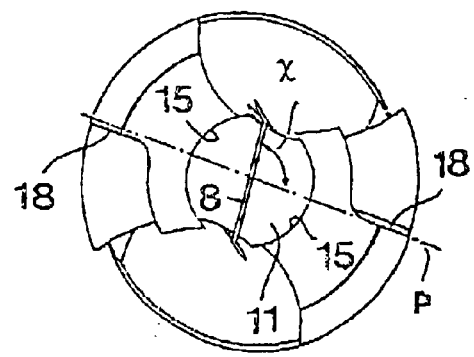
FIG. 11 is an end view of the holder part according to FIGS. 8 and 10.

In FIG. 4, it is shown how the slot 8 extends at a certain angle α to a conceived plane P, which is parallel to the individual carrier surface 18 on the holder part. During operation, the tool rotates in the direction of the arrow A in FIG. 4. This means that the individual carrier surface 18 drives the loose top in the anti-clockwise direction in FIG. 4. The angle α, which is measured between the slot 8 and each carrier surface 18 seen in the driving direction thereof, should in accordance with a preferred embodiment of the invention be acute, e.g., be within the range of 45–85°. In this way, the pin sections 13 will be provided with a tendency to be separated during rotation of the tool, thereby additionally strengthening the force by which the pin elements are clamped towards the internal contact surface 15 of the seat 11.

In FIG. 4, it is also shown how the tightening screw 20 extends perpendicularly to the two plane surfaces that define the slot 8.

Reference is now made to FIGS. 8–11, which illustrate another alternative embodiment of the invention. In this case, the male pin 10 of the male/female coupling is formed on the loose top 2, while the seat 11 is formed in the holder part 1. More precisely, the seat 11 is placed centrically in the front end of the holder part 1 and is delimited by two opposite contact surfaces 15 of a slightly conical shape. A bottom in the seat 11 is designated 33. Outside the seat 15, there are partially conical surfaces 16, herein called "cone surfaces", which interact with likewise conical surfaces 17 on the rear end of the loose top 2 (observe that the loose top 2 is shown in an upside down state in FIG. 9). However, in this case, the cone surfaces 16, 17 are of a different character than the corresponding cone surfaces in the embodiment example according to FIGS. 1–7. Thus, the cone surfaces 16 converge in the direction forwards in relation to the holder part (see FIG. 10), while the cone surfaces 17 diverge in the same cone angle in the direction backwards in relation to the loose top.

Driving or torque transmitting carrier surfaces 18 are arranged to interact with substantially radial abutment surfaces 19 on the shoulders on the loose top 2.

In this case, the slot 8 ends in the bottom 33 of the seat 11. Between the hole 12 and the front or outer end of the slot 8, a second hole 34 is formed having an oval or out of round cross-section shape, which is delimited by two recesses or countersinks in the plane surfaces that define the slot 8. In the hole 34, a key (not shown) may be inserted, having an analogous, out of round cross-section shape that can guarantee a separation of the branches 9 on each side of the slot during turning. Thus, together with the key, the hole 34 forms a means for increasing the smallest diameter of the seat so much that it exceeds the maximum diameter of the pin 10.

In the embodiment according to FIGS. 8–11, where the seat 11 is formed in the holder part 1 and the male pin 10 in the loose top 2, the slot 8 extends at an obtuse angle X to the plane P, i.e., to the driving carrier surfaces 18. By the fact that the angle X is obtuse, the branches 9 and the contact surfaces 15 that define the seat 11 are provided with a tendency to approach each other when the holder part 1 transmits torque to the loose top.

The described tool of FIGS. 8–11 operates in the following way. When the loose top 2 is to be applied to the holder part 1, the seat 11 is widened by means of a key, which is inserted into the elongate hole 34 and turned, causing outward elastic bending of the branches 9 against the action of the inherent resilient force in the same. After such an expansion of the seat, the free end of the pin 10 (which has the largest diameter) can pass through the front or outer opening of the seat (which has the smallest diameter of the seat). When the pin has been applied in the seat, the key is removed from the hole 34, whereupon the branches 9 spring back so that the seat surfaces 15 are pressed against the envelope surface of the pin.

When the tool operates in a workpiece, the inclination of the slot 8 (the obtuse angle X) contributes to an increase of the pressing force of the branches towards the pin in the same way as the thrust forces acting between the cone surfaces 16, 17 strive at compressing the branches while providing great clamping force.

It should be mentioned that the slot 8 that separates the branches 9 should have a certain smallest length extension in order to enable functional spring-away of the branches. Generally, the length of the slot should amount to at least 0.5 times and at most 2 times the diameter of the holder part 1. In the example according to FIGS. 1–7, where the slot terminates in the end surface of the male pin 10, the length of the slot amounts to about 1.1 times the diameter of the holder part 1. In the example according to FIGS. 8–11, where the slot terminates in the bottom of the seat 11, the slot has a length of about 0.5 times the diameter.

A primary advantage of each disclosed embodiment of the tool according to the invention, is that the loose top or the cutting part may be mounted and dismounted in a simple and smooth way without the holder part necessarily needing to be removed from a machine. Furthermore, the two main parts of the tool, i.e. the holder part and the cutting part, respectively, can be series produced separately in a simple and efficient way while guaranteeing good centering of the cutting part in relation to the holder part. Thus, the parts can be manufactured by means of simple machining operations and with a minimum of advanced grinding operations. Furthermore, the tool parts get a long service life by not being exposed to needless wear.

Feasible Modifications of the Invention

The invention is not limited solely to the embodiments described above and illustrated in the drawings. Thus, clamping devices other than a screw may be used in the embodiment according to FIGS. 1–7, e.g., a wedge device, for the bringing together of the two pin sections. In the embodiment according to FIGS. 8–11, the separation of the two branches that resiliently clamp the male pin of the loose top may be provided in another way than by means of a key to an oval hole. For instance, a pressing screw may be used. Further, the geometry of the interface between the cutting part and the holder part may be varied most considerably within the scope of the invention.

Although the invention above has been described with references made to the male pin and the seat most preferably having a conical, tapering basic shape, the same may also have another rotationally symmetrical shape. For instance, both the male pin and the seat may have an at least one of said components, e.g., the male pin, a conical shape, while the other may be given a cylindrical shape. Instead of a genuinely conical shape (which is determined by a linear generatrix), also envelope surfaces having a curved basic shape may be used, i.e., a rotationally symmetrical shape that is determined by an arched or irregular generatrix.

The present invention having been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A rotatable tool for chip removing machining comprising:
a holder part defining a center axis of rotation, the holder part including an axially front end in which a slot is formed between elastically flexible branches of the holder part,
a cutting part detachably connected to the branches,
the holder part and the cutting part together forming a male/female coupling comprising a male part disposed on one of the holder part and the cutting part, and a female part disposed on the other of the holder part and the cutting part, the male part received in the female part,
first support surfaces formed on the front end of the holder part, and second support surfaces formed on the cutting part and engaging the first support surfaces, the first and second support surfaces situated radially outside of the male/female coupling and being at least partially conically shaped for elastically urging the male and female parts radially together in response to the transmittal of axial thrust loads from the second support surfaces to the first support surfaces.

2. The rotatable tool according to claim 1, wherein the male part and the female part disposed on the holder part is the male part, the branches consisting of two branches, the male part comprising a pin having two pin sections disposed on respective ones of the branches, the first support surfaces diverging toward the cutting part, and the second support surfaces converging toward the holder part.

3. The rotatable tool according to claim 2, wherein the male and female parts are shaped symmetrically about the center axis of rotation, each of the male part and female part having a circular cross section, wherein a smallest diameter of the female part is smaller than a largest diameter of the male part when the branches are in a rest state.

4. The rotatable tool according to claim 3 wherein the front end of the holder part includes two diametrically opposed carrier surfaces, and the cutting part including a pair of corresponding abutment surfaces arranged to engage respective ones of the carrier surfaces for transmitting torque to the cutting part, the slot extending at an acute angle relative to the carrier surfaces as viewed in an axial direction of the holder part, the second support surfaces applying an axial force to the first support surfaces urging the pin sections away from each other during a cutting operation.

5. The rotatable tool according to claim 2 further including a manually actuable clamping device for elastically deforming the pin sections toward one another.

6. The rotatable tool according to claim 5 wherein the clamping device comprises a bolt passing through one of the branches and across the slot and threadedly mounted in the other branch.

7. The rotatable tool according to claim 1 wherein the one of the male part and the female part disposed on the holder part is the female part, the branches consisting of two branches, the female part including two seat portions disposed on respective branches, wherein the first support surfaces converge toward the cutting part, and the second support surface diverge toward the holder part.

8. The rotatable tool according to claim 7 wherein an outer surface of the male part diverges toward the holder part, and the female part converges toward the cutting part, wherein a smallest diameter of the female part being smaller than a largest diameter of the male part when the branches are in a relaxed state.

9. The rotatable tool according to claim 8 wherein the slot is formed by two mutually facing inside surfaces of the branches, the slot including two recesses formed in respective ones of the inside surfaces, the recesses together forming a hole having an out-of-round shape and adapted to receive a key for urging the branches apart.

10. The rotatable tool according to claim 7 wherein the front end of the holder part includes two diametrically opposed carrier surfaces, and the cutting part includes two corresponding abutment surfaces arranged to engage respective ones of the carrier surfaces for transmitting torque to the cutting part, the slot extending at an obtuse angle relative to the carrier surfaces as viewed in an axial direction of the holder part, wherein forces applied to the carrier surfaces during the torque transmission urge the branches toward one another to increase pressure between the male part and the female part.

* * * * *